US006768941B2

(12) United States Patent
Sasena et al.

(10) Patent No.: US 6,768,941 B2
(45) Date of Patent: Jul. 27, 2004

(54) ENGINE CALIBRATION DEVELOPMENT PROCESS

(75) Inventors: Thomas E. Sasena, Columbus, IN (US); Jeff S. O'Neill, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 68 days.

(21) Appl. No.: 10/289,616

(22) Filed: Nov. 7, 2002

(65) Prior Publication Data

US 2004/0093152 A1 May 13, 2004

(51) Int. Cl.[7] ................................................ G06F 19/00
(52) U.S. Cl. .......................... 701/114; 701/33; 701/115
(58) Field of Search ................................ 701/114, 115, 701/33; 73/117.3

(56) References Cited

U.S. PATENT DOCUMENTS 4,271,402 A * 6/1981 Kastura et al. ............. 340/459
4,383,441 A 5/1983 Willis et al. ............... 73/117.3
5,284,116 A * 2/1994 Richeson, Jr. ........... 123/406.2
5,426,585 A 6/1995 Stepper et al. ......... 364/424.03
5,560,337 A 10/1996 Bolander et al. ........... 123/435
5,602,733 A 2/1997 Rogers et al. ........ 364/424.034
5,974,350 A 10/1999 Davis, Jr. et al. ............. 701/36
6,308,697 B1 * 10/2001 Surnilla et al. ............. 123/672

* cited by examiner

*Primary Examiner*—Willis R. Wolfe
*Assistant Examiner*—Johnny H. Hoang
(74) *Attorney, Agent, or Firm*—Barnes & Thornburg

(57) ABSTRACT

A system of developing a calibration parameter set for an internal combustion engine includes a host computer having an engine calibration database and a calibration rules check database stored therein, and an engine/calibration development computer separate from the host computer. A first engine calibration parameter set is provided from the engine calibration database of the host computer to the engine/calibration development computer, and therein at least one parameter of the first engine calibration parameter set is modified to form a second engine calibration parameter set. The second engine calibration parameter set or the at least one modified parameter of the first engine calibration parameter set is then provided to the host computer, and therein a calibration rules check of the second engine calibration parameter set or the at least one modified parameter of the first engine calibration parameter set is conducted against the calibration rules check database.

22 Claims, 5 Drawing Sheets

ENGINE CALIBRATION DEVELOPMENT PROCESS

FIELD OF THE INVENTION

The present invention relates generally to systems for developing and/or modifying calibration parameter sets for computer controlled internal combustion engines.

BACKGROUND AND SUMMARY OF THE INVENTION

It is generally known to electrically control various functions of an internal combustion engine via a suitable processor, computer or controller (hereinafter an "engine control computer"). Conventionally, a number of desired engine performance characteristics and control features are specified, and one or more software algorithms are developed therefrom and formed into an engine calibration parameter set, or engine calibration, and this engine calibration is then downloaded into the engine control computer via a suitable service/recalibration tool. Thereafter, the engine control computer is operable to control operation of the engine according to the engine calibration resident therein.

With conventional service/recalibration tools, the tools themselves are typically programmed on a set of calibration rules that define compatibility of the various engine calibration data components, limits and ranges of the calibration data, and so forth. In order to perform a successful engine calibration, the conventional tools must accordingly include a version of the rules that is compatible with the engine calibration programmed therein. Compatible revisions of both the engine calibration parameter sets and the calibration rules must therefore be maintained and matched for subsequent engine calibration procedures.

The present invention provides for an engine calibration development or modification process wherein a master set of engine calibration rules is maintained in a single database within a host computer. Calibration rules checking procedures throughout an engine calibration development and/or modification process are conducted, when possible, by the host computer according to the master set of engine calibration rules resident therein. Engine calibration development and/or modification is generally conducted with the assistance of an engine/calibration development computer separate from the host computer, and at times when the engine/calibration development computer is not connected with, or linked to, the host computer. Calibration rules checking can alternatively be conducted by the engine/calibration development computer using a local set of engine calibration rules. In accordance with the process, this local set of engine calibration rules resident within the engine/calibration development computer is automatically updated upon establishing or re-establishing a communications path between the host computer and the engine/calibration development computer.

The present invention comprises at least one or more of the following features or combinations thereof. A method of developing a calibration parameter set for an internal combustion engine is provided comprising the steps of providing a first engine calibration parameter set to a calibration development computer, modifying in the calibration development computer at least one parameter of the first engine calibration parameter set to form a second engine calibration parameter set, providing one of the second engine calibration parameter set and the at least one modified parameter of the first engine calibration parameter set to the host computer, and conducting in the host computer a first calibration rules check of the one of the second engine calibration parameter set and the at least one modified parameter of the first engine calibration parameter set against a rules check database resident therein.

A system for developing a calibration parameter set for an internal combustion engine is provided comprising a host computer including a first rules check database resident therein, and a calibration development computer configured to modify at least one parameter of a first engine calibration parameter set to form a second engine calibration parameter set, the calibration development computer configured to thereafter provide one of the second engine calibration data set and the at least one modified parameter of the first engine calibration parameter set to the host computer, the host computer configured to conduct a calibration rules check of the one of the second engine calibration data set and the at least one modified parameter of the first engine calibration parameter set against the first rules check database.

These and other features of the present invention will become more apparent from the following description of the illustrative embodiments.

DESCRIPTION OF THE ILLUSTRATIVE EMBODIMENTS

Figure 1:
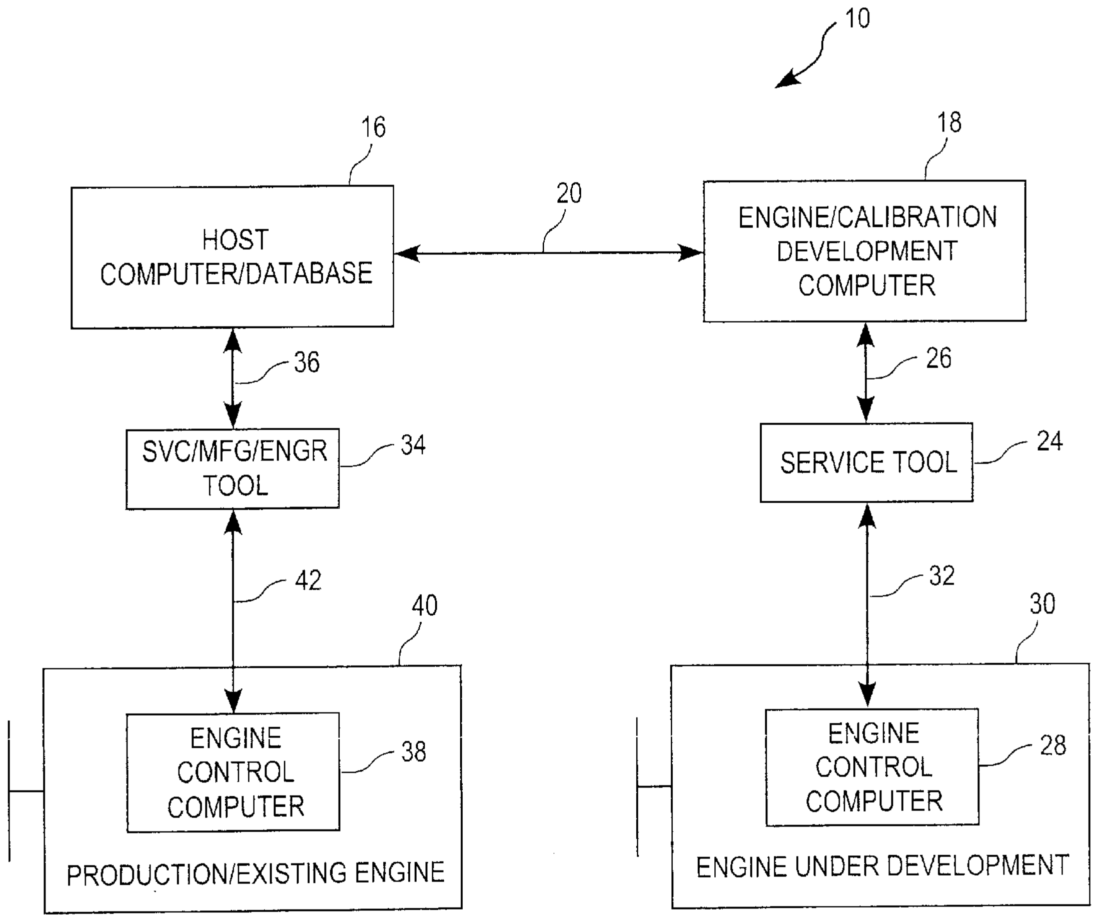
FIG. 1 is a block diagram illustration of one embodiment of a hardware system for developing engine calibrations.

For the purposes of promoting an understanding of the principles of the invention, reference will now be made to a number of embodiments illustrated in the drawings and specific language will be used to describe the same. It will nevertheless be understood that no limitation of the scope of the invention is thereby intended.

Referring now to FIG. 1, one illustrative embodiment of a hardware system 10 for developing software calibrations for internal combustion engines is shown. As is known in the art, a software calibration for an internal combustion engine typically includes data identifying desired engine operating characteristics, data identifying engine operating boundaries and thresholds, control routines for electronically controlling various aspects of the engine, and the like. For purposes of this document, a "software calibration for an internal combustion engine" may be referred to as an "engine calibration parameter set" or simply an "engine calibration", it being understood that all of these bracketed terms are intended to have the same meaning. System 10 includes a host computer 16 configured for communication with an engine/calibration development computer 18 via communications path 20. In one embodiment, host computer 16 is a mainframe computer resident in, or maintained by, an engine manufacturer. Alternatively, host computer 16 may be any known computer or computer system including at least the basic components and functional capabilities required of computer 16 as will be described hereinafter with respect to FIGS. 2 and 3A–3C. Engine/calibration development computer 18 may be of known construction and capable of communicating with host computer 16 in a manner that will be described in greater detail hereinafter, of executing one or more software algorithms and of storing data in and retrieving data from, for example, a memory unit 68 resident within computer 18 (see FIG. 2). Examples of known computers suitable for use as engine/calibration development computer 18 include, but are not limited to, a personal computer (PC), a laptop or notebook computer, or the like, although engine/calibration development computer 18 may alternatively be any known computer or computer system including at least the basic components and function capabilities required of computer 18 as will be described in greater detail herein after with respect to FIGS. 2 and 3A–3C. In any case, communications path 20 may be or include any of a hardwired connection, a telephone modem connection, an internet connection (e.g., via the World Wide Web or WWW), an intranet connection (e.g., a restricted access network), or the like. Alternatively, path 20 need not be a direct communication path, but may instead represent an indirect data transfer path, such as via a data storage disk, tape or other known data storage media. In this regard, host computer 16 and engine/calibration development computer 18 may be configured to include suitable data storage/retrieval interfaces, such as for example, floppy memory disk drives, CD ROM drives, or other known data storage/retrieval interfaces.

Engine/calibration development computer 18 is configured to communicate with a service/recalibration tool 24 of known construction via communication path 26, wherein communication path 26 may be any known parallel or serial communications link, such as for example, a RS232 link, a universal serial bus (USB) link or the like. Alternatively, path 26 may represent a wireless communication path or an indirect data transfer path as described hereinabove with respect to communication path 20. Service/recalibration tool 24 is, in turn, configured to communicate with an engine control computer 28 via communication path 32, wherein communication path 32 may be any known parallel or serial communications link. For example, in at least the medium and heavy-duty diesel engine industries, communication link 32 may be a SAE (Society of Automotive Engineers) J1939 or J1587 serial data link. Those skilled in the art will recognize that communication path 32 may be implemented as other known communication structures and configured to communicate via other known communication protocols. In any case, engine control computer 28 is configured to control and manage the overall operation of an engine under development 30, although it is to be understood that the concepts of the present invention may also be applied to other components and control computers under development, such as for example, an electronically-controlled transmission and corresponding transmission control computer, or the like. Service/recalibration tool 24, communication path 26 and communication path 32 are configured, as is known in the art, as an interface to download engine calibrations, engine calibration modifications and/or other engine control information or data from the engine/calibration development computer 18 to the engine control computer 28, and to upload performance, diagnostic and other data from engine control computer 28 to the engine/calibration development computer 18.

Host computer 16 may further be configured to communicate with a service, manufacturing and/or engineering tool 34 of known construction via communication path 36. In one embodiment, tool 34 may be structurally and functionally identical to service/recalibration tool 24, in which case communication path 36 may likewise be identical to communication path 26 described hereinabove. Alternatively, tool 34 may represent a conventional manufacturing tool or engineering development tool configured to download or otherwise exchange information with host computer 16. In any case, tool 34 is, in turn, configured to communicate with an engine control computer 38 of a production or existing engine 40 via communication path 42, wherein communication path 42 may be identically as described hereinabove with respect to communication path 26. Service, manufacturing and/or engineering tool 34, communication path 36 and communication path 42 are configured, as is known in the art, as an interface to download production engine calibrations and/or engine calibration modifications from the host computer 16 to the engine control computer 38.

Those skilled in the art will recognize that in addition, or alternatively, to being used to develop engine calibration parameter sets for new engines, the hardware system 10 of FIG. 1 may be used to modify and/or further develop existing engine calibration parameter sets, as will be described in greater detail hereinafter. It will further be recognized that although the host computer 16 is illustrated in FIG. 1 as being configured to load engine calibration parameter sets into the engine control computers of production or existing engines 40, and the engine/calibration development computer 18 is illustrated as being configured to load engine calibration parameter sets or modifications thereto into the engine control computers of engines under development 30, the service tools 24 and 34 are typically functionally identical so that either computer 16 or 18 can be used to perform any of the described downloading or uploading functions.

Figure 2:
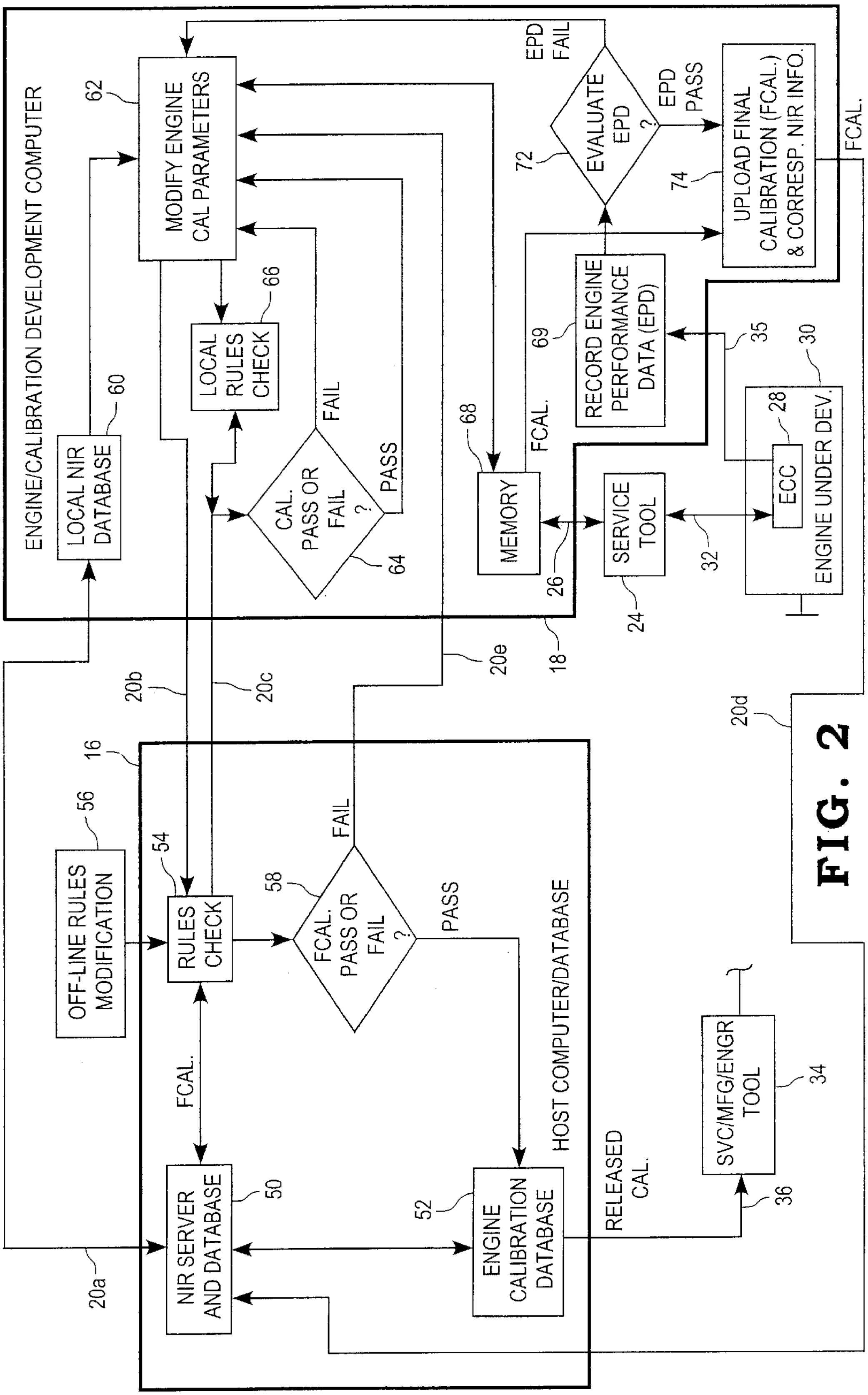
FIG. 2 is a block diagram illustrating some of the engine calibration development process steps carried out by each of the hardware components of FIG. 1.

Referring now to FIG. 2, a block diagram is shown illustrating, in part, some of the hardware structures included within each of the hardware components illustrated in FIG. 1. For example, referring to FIG. 2 host computer 16 includes a new installation request (NIR) server and database 50 of known construction, and the engine/calibration development computer 18 includes a local NIR database 60 connected in communication with the NIR server and database 50 of the host computer 16 via signal path 20*a*. The NIR server and database 50 of host computer 16 is also connected through process 74 in communication with a memory unit 68 resident within the engine/calibration development computer 18 via signal path 20*d*, wherein memory unit 68 is configured to store therein engine calibration data sets and/or modifications thereto, as well as other data and control algorithms necessary to the overall operation of computer 18.

Host computer 16 further includes an engine calibration database 52 having one or more "production" engine calibration parameter sets stored therein, wherein "production" engine calibration parameter sets refer to those that have been released for production use. Host computer 16 further includes a rules check database 54 containing a master set of calibration rules relating one or more of the parameters of any one engine calibration to one or more other parameters of that calibration for purposes of compatibility. For example, the requested engine size (e.g., cylinder displacement) must be capable of meeting the requested engine output torque characteristics, and one example engine calibration rule, which is not intended to be limiting in any way of any of the claims appended hereto, may accordingly define ranges of acceptable engine output torque ratings for given engine sizes. Any modifications to the rules check database 54 occurs off-line as part of a rules modification procedure, represented in FIG. 2 as block 56 outside of host computer 16, and the frequency of any such rules modification procedures typically occurs asynchronously, although may occur synchronously, with the engine calibration development process of the subject invention. Generally, the rules modification procedure represented by block 56 is a conventional procedure unrelated to, or off-line from, the process of the subject invention that allows for modification of any one or more of the rules resident within the rules check database 54 at any time. In any case, the engine/calibration development computer 18 includes a local rules check database 66 that is connected in communication with the rules check database 54 of the host computer 16 via signal path 20*c*. The local rules check database 66 is identical in structure and function to the rules check database 54 of the host computer 16, and includes the identical calibration checking rules that are contained within the rules check database 54 as long as communications path 20*c* exists. In cases where the engine/calibration development computer 18 is not connected in communications with the host computer 16, any modifications to the master rules check database 54 of host computer 16 will not be transferred to the local rules check database 66 of computer 18 until communications path 20*c* is established or re-established. In one embodiment, as will be described in greater detail hereinafter, the host computer 16 is operable to automatically update the local rules check database 66 resident within the engine/calibration development computer 18 with the contents of the rules check database 54 whenever communications path 20*c* is established. The memory unit 68 and local NIR database 60 are also connected, through process step 62, in communications with the rules check database 54 of the host computer 16 via signal paths 20*b* and 20*e*. It is to be understood that signal paths 20*a*–20*e* illustrated in FIG. 2, comprise the signal path 20 illustrated in FIG. 1, and that signal path 20 is broken down into signal paths 20*a*–20*e* in FIG. 2 only for ease of illustration and functional description of the subject invention.

Referring now to FIGS. 2 and 3A–3C, a process 100 for developing a new engine calibration parameter set for a new or existing engine 30 will now be described. It will be understood that some of the steps of process 100 may be omitted in cases where an existing engine calibration parameter set is being further developed or modified, and identification of such omitted steps will be included in the following description. FIG. 2 illustrates some of the engine calibration development process steps carried out by or within, each of the hardware components illustrated in FIG. 1, and FIGS. 3A–3C illustrate a flowchart representing the overall process 100 for developing a new engine calibration using the hardware system of FIG. 1. Process 100 will be described with the aid of FIGS. 2 and 3A–3C.

Process 100 allows a user of the engine/calibration development computer 18 (or other suitable computer) to begin developing a new calibration parameter set for a new or existing engine in the form of a new installation request (NIR). Process 100 begins at step 102 where the link 20 between the engine/calibration development computer 18 and the host computer 16 is established so that the NIR user (user of computer 18) may access the NIR server and database 50 resident in the host computer 16. As described hereinabove, communication path 20 may be a hardwired or wireless link, or may alternatively be or include an indirect data transfer link. In any case, process 100 advances from step 102 to step 104 where the NIR user provides over the communication link 20 information to the NIR server and database 50 of the host computer 16 relating to the specifications of the new or desired engine installation. Such specifications may include for example, but are not limited to, engine displacement, engine power rating, engine output torque requirements, and the like. Thereafter at step 106, the NIR server 50 of the host computer 16 is operable to select from any existing engine calibration parameter sets stored in the engine calibration database 52 an appropriate one of such existing engine calibration parameter sets that most closely matches the NIR information entered at step 104 by the NIR user. Information relating to one or more engines that most closely match the NIR information entered by the NIR user, as well as the engine calibration parameter set that most closely matches the NIR information is sent to the local NIR database 60 of the engine/calibration development computer 18 via communications path 20*a*.

The initial engine calibration parameter set selected by the NIR server 50 of host computer 16 may range from matching the requested specifications exactly to matching them only slightly. In cases where the initial engine calibration parameter set matches the requested specifications exactly or closely enough to be acceptable to the user of the NIR computer/interface 102, process 100 may skip steps 108 and 110 and advance directly to step 112 as illustrated by the dashed line connecting blocks 106 and 112 in FIG. 3A. Conversely, in cases where the initial engine calibration parameter set does not match the required specifications exactly or closely enough to be acceptable to the user, process 100 advances from step 106 to step 108 where the NIR user makes adjustments or modifications to one or more of the requested specifications and/or one or more of the parameters of the initial calibration parameter set. In FIG. 2, functional block 62 corresponds to a known process or algorithm that allows the user of the engine/calibration development computer 18 to access the local NIR database 60 and make such adjustments or modifications. Thereafter at step 110, the engine/calibration development computer 18, via process block 62, processes the adjustments or modifications to the initial calibration parameter set made by the NIR user at step 108, and correspondingly modifies the initial engine calibration parameter set to produce a new prototype engine calibration parameter set (PCAL.).

Following step 110 (or following step 106 in cases where the initial calibration matches the requested specifications exactly or closely enough to be acceptable), process 100 advances to step 112 where the engine/calibration development computer 18 determines via conventional techniques whether it is currently in communications with the host computer 16; i.e., whether wired or wireless communication path 20 is established between computers 16 and 18. If so, process 100 advances to step 114 where the engine/calibration development computer 18 is operable to transfer either the modified or adjusted parameters of the initial engine calibration parameter set that were made at step 108 or the entire prototype engine calibration parameter set, PCAL., to the rules check database 54 of host computer 16 via communications path 20*b*, and host computer 16 is then operable to conduct a rules check of either the modified or adjusted parameters of the initial engine calibration that were made at step 108 or the entire PCAL against the master rule set resident in the rules check database 54. Thereafter at step 116, the host computer 16 is operable to update the local rules check database 66 resident within the engine/calibration development computer 18 (see FIG. 2) via communication path 20*c* with the master calibration rule set or sets resident in the rules check database 54 under certain circumstances. For example, if communication paths 20*b* and 20*c* have recently been established or re-established after some period where engine/calibration development computer 18 was not linked in communication with host computer 16, it may be possible that an off-line rules modification to the rules check database 54 of host computer 16 was made during this period, and that the local rules check database 66 of the engine/calibration development computer 18 therefore will not include the most recent version of the master calibration rule set or sets. In such cases where communication paths 20*b* and 20*c* are established after some period of not having been established, host computer 16 is accordingly operable at step 116 to update the local rules check database 66 with the current rule set or sets resident in the rules check database 54 of the host computer 16. As another example, and as was described hereinabove, off-line rules modifications may occur at any time and the frequency of such rules modifications may be asynchronous with process 100 or any of its steps. Thus, in cases where communication paths 20*b* and 20*c* are established and host computer 16 determines that a new modification of the rules check database has recently occurred, host computer 16 is accordingly operable at step 116 to automatically update the local rules check database 66 with the recently modified rule set or sets resident in the rules check database 54 of the host computer 16. In any case, the host computer 16 is further operable at step 116 to provide the engine/calibration development computer 18, via communication path 20*c*, with the results of the calibration rules check process.

If, at step 112, it is determined that the engine/calibration development computer 18 is not in communication with the host computer 16 via communication paths 20*b* and 20*c*, step 112 advances to step 118 where the engine/calibration development computer 18 conducts the rules check of either the modifications or adjustments made to the initial engine calibration parameter set at step 108 or the entire PCAL. against the local rule set or sets resident within block 66. From either of steps 116 or 118, process 100 advances to step 120 where it is determined by the decision block 64 of the engine/calibration development computer 18 whether the calibration rules check, conducted at step 114 or at step 118 of either the modified or adjusted parameters of the initial engine calibration parameter set made at step 108 or the entire PCAL., passed or failed. A "pass" means that all parameters of the engine calibration parameter set being tested are within acceptable ranges and compatible with each other, and a "fail" means that one or more of the parameters of the engine calibration parameter set being tested are outside of acceptable ranges and/or are incompatible with one or more of the other parameters of the engine calibration parameter set.

If the engine/calibration development computer 18 determines at step 120 that PCAL. (or alternatively the modifications or adjustments made to the initial engine calibration parameter set made at step 108) failed the calibration rules check process of either of steps 114 or 118, process 100 advances to step 122 where the engine/calibration development computer 18 notifies the NIR user, via block 62, of the rules check failure, and provides the NIR user with information relating to the one or more parameters that failed. Thereafter, process 100 loops back to step 108 where the NIR user may make further adjustments or modifications to or affecting one or more of the parameters of PCAL., and computer 18 is operable thereafter at step 110 to process the information provided by the NIR user at step 108 to produce an updated prototype engine calibration parameter set (PCAL.), and thereafter at steps 112–120 to perform another calibration rules check of either the adjustments or modifications to the previous prototype engine calibration parameter set or the new, revised prototype engine calibration parameter set.

Execution of the loop of steps 108–120 continues until a version of PCAL. (or the initial calibration parameter set selected by the NIR server 50) passes the calibration rules check process of steps 112–120. Execution of process 100 then advances from the "pass" branch of step 120 to step 124 where the engine/calibration development computer 18 stores the version of PCAL. that passed the calibration rules check into the local memory 68. Thereafter, process 100 advances to step 126 of FIG. 3B.

Figure 3A:
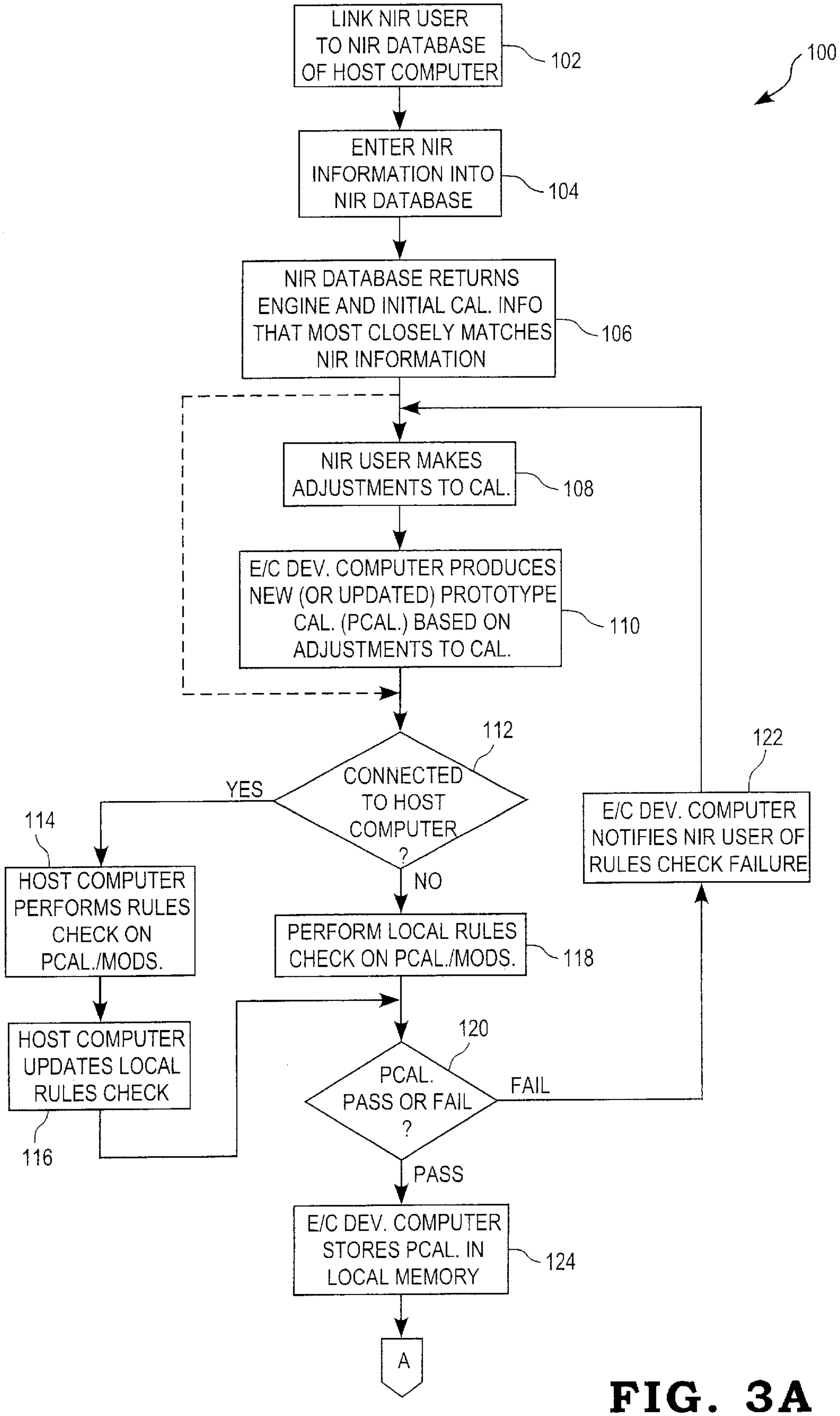
FIGS. 3A–3C illustrate a flowchart representing a process for developing an engine calibration using the hardware system of FIG. 1.
Figure 3B:
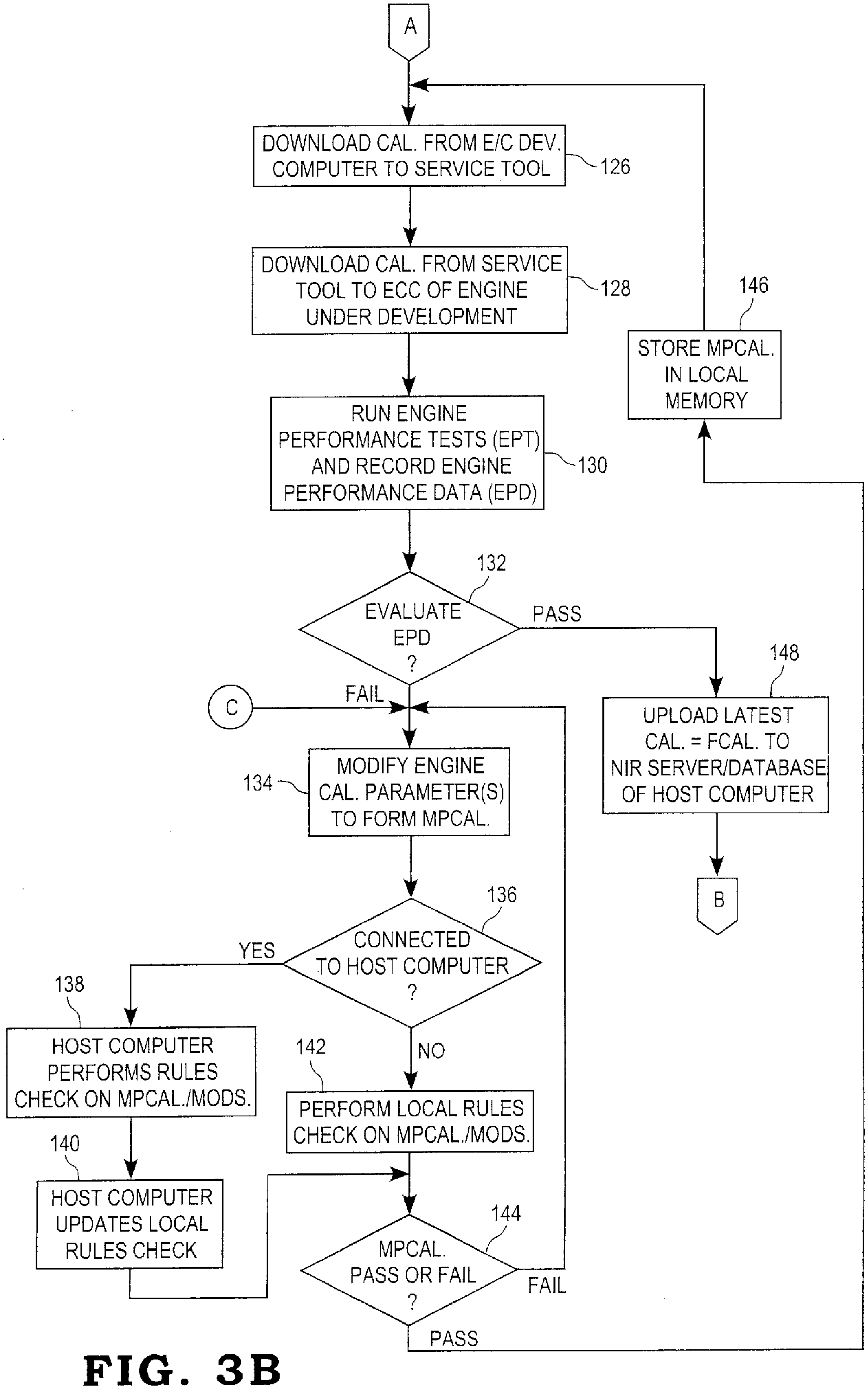

Referring now to FIG. 3B, process 100 continues with step 126 wherein a user of the engine/development computer 18 downloads the version of PCAL. that passed the calibration rules check process of steps 112–120 and is stored in local memory 68, to the service/recalibration tool 24 via communication path 26. Thereafter at step 128, the prototype engine calibration parameter set, PCAL., is downloaded from the service/recalibration tool 24 to the engine control computer (ECC) 28 of the engine under development 30. While the downloading of PCAL. into ECC 28 is illustrated in FIG. 2 and described at steps 126–128 of process 100 as being accomplished via service tool 24, it is contemplated that computer 18 may alternatively be configured to interface directly with ECC 28, and therefore download PCAL. from memory unit 68 to ECC 28. Appropriate modifications to steps 126 and 128 of process 100 to accommodate this alternative embodiment must accordingly be made, wherein such modifications represent a mere mechanical step for a skilled artisan.

In any case, process 100 advances from step 128 to step 130 where the engine 30 is operated and one or more engine performance tests (EPT) are conducted to test the performance of PCAL. against established or desired engine performance standards. Various operating parameters of engine 30 are monitored by the engine/calibration development computer 18 during these one or more engine performance tests via conventional means. For example, computer 18 may be configured to monitor suitable operating parameter sensors and/or engine performance messages broadcast over a datalink 35 (e.g., a SAE J1939 or J1587 data link). Additionally or alternatively, engine performance data may be collected by ECC 28 during the operation of engine 30, and transferred to the memory unit 68 of computer 18 via communications paths 32 and 26. In any case, the engine/calibration development computer 18 is further operable at step 130 to record resulting engine performance data (EPD). Thereafter at step 132, EPD are evaluated to determine whether the engine 30 operating under the control of PCAL. passed or failed the one or more engine performance tests, as illustrated by block 72 of FIG. 2. If, at step 132, it is determined that the engine 30 operating under the control of PCAL. passed the one or more engine performance tests, process 100 advances to step 148 where PCAL. is uploaded from memory 68 as a final engine calibration (FCAL.) to the NIR server and database 50 of host computer 16 via communication path 20*d*.

Conversely, if at step 132 it is determined that the engine 30 operating under the control of PCAL. fails one or more of the one or more engine performance tests, process 100 advances to step 134 where a user of engine/calibration development computer 18 adjusts or modifies one or more parameters of PCAL. to form a modified prototype calibration parameter set (MPCAL.) via functional block 62 of FIG. 2. Thereafter, a rules check of either the modified parameters of PCAL. that were made at step 134 or the entire MPCAL. itself must be conducted. At step 136 it is determined whether the engine/calibration development computer 18 is currently in communications with the host computer 16; i.e., via a wired or wireless communication path 20*b*. If so, process 100 advances to step 138 where the engine/calibration development computer 18 is operable to transfer either the modified parameters of PCAL. that were made at step 134 or the entire MPCAL. to host computer 16, and host computer 16 is then operable to conduct a rules check of either the modified parameters of PCAL. that were made at step 134 or the entire MPCAL. Thereafter at step 140, the host computer 16 is operable to update a local rules check database 66 resident within the engine/calibration development computer 18 (see FIG. 2) via communication path 20*c* with the corresponding rule set or sets resident in the rules check database 54 as described hereinabove with respect to steps 112–120. The host computer 16 is further operable at step 140 to provide the engine/calibration development computer 18, via communication path 20*c*, with the results of the rules check of MPCAL.

If, at step 136, it was determined that the engine/calibration development computer 18 was not in communication with the host computer 16 via communication paths 20*b* and 20*c*, step 136 advances to step 142 where the engine/calibration development computer 18 conducts the rules check of MPCAL. against the rule set or sets resident within block 66. From either of steps 140 or 142, process 100 advances to step 144 where it is determined whether the calibration rules check, conducted at step 138 or at step 142 of either the modified parameters of PCAL. that were made at step 134 or the entire MPCAL., passed or failed (see also block 64 of FIG. 2). If the rules check failed, the user of the engine/calibration development computer 18 is notified via functional block 62 of the one or more parameters that failed the rules check, and process 100 loops back to step 134 where the user may make adjustments or modifications to one or more of the parameters of MPCAL. to form an updated MPCAL. The rules check procedure of steps 136–142 on the revised or updated MPCAL. is again conducted, and the loop of steps 134–144 is continually executed until a version of MPCAL. passes the calibration rules check procedure. In this case, process 100 advances from the "pass" branch of step 144 to step 146, where the engine/calibration development computer 18 stores the version of MPCAL. that passed the calibration rules check into local memory 68, and step 146 then loops back to steps 126 and 128 where the version of MPCAL. that passed the calibration rules check process of steps 136–142 is downloaded to the engine control computer 28 of engine 30, and performance testing of engine 30 is conducted under the control of MPCAL. The loop of steps 126–146 continue until a version of MPCAL. is developed that passes both the one or more engine performance tests of step 130 and the calibration rules check process of steps 136–142. At this point, process 100 reaches step 148 where, as described hereinabove with respect to PCAL., the version of MPCAL. that passes the one or more engine performance tests and calibration rules check process is uploaded from memory 68 as a final engine calibration (FCAL.) to the NIR server and database 50 of host computer 16 via communication path 20*d*. Thereafter, process 100 advances to step 150.

Figure 3C:
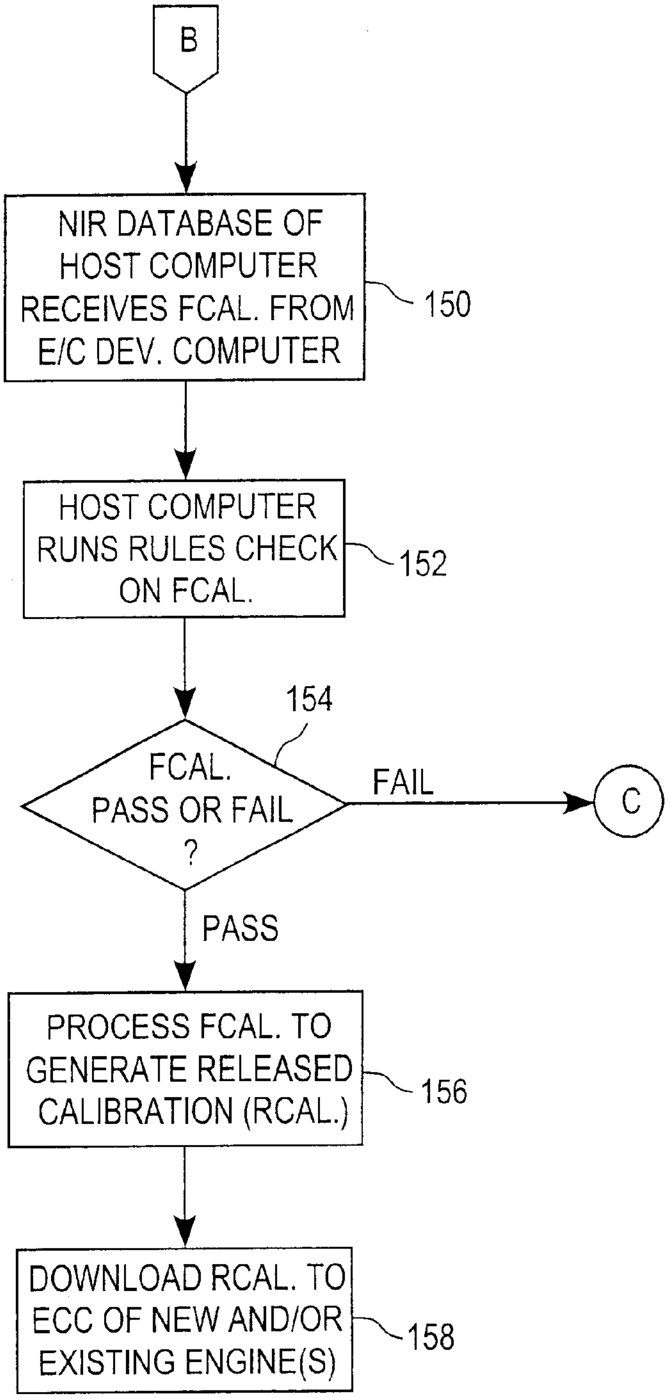

Referring now to FIG. 3C, process 100 continues with step 150 wherein the NIR server and database 50 of host computer 16 receives the final engine calibration parameter set FCAL. from the engine/calibration development computer 18. It is contemplated that step 150 may be carried out in any of a number of ways, and examples include, but are not limited to, direct uploading of FCAL. from computer 18 to computer 16 via wired or wireless communications path 20*d* (FIG. 2), and/or indirectly via a suitable intermediate data storage medium. In any case, process 100 advances from step 150 to step 152 where the host computer 16 is operable to conduct a calibration rules check on FCAL. against the rule set or sets resident in the master rules check database 54, and thereafter to step 154 where host computer 16 determines whether FCAL. passed or failed the rules check. These steps correspond in FIG. 2 to the process flow of FCAL. from block 50 to block 54 to block 58. If, at step 154, the host computer 16 determines that FCAL. passes the calibration rules check process of step 152, process 100 advances to step 156. Otherwise, if host computer 16 determines at step 154 that FCAL. fails the calibration rules check process of step 152, process 100 loops back to step 134 of FIG. 3B where the user of the engine/calibration development computer 18 is notified, via communications path 20*e* and function block 62, of the one or more parameters of FCAL. that failed the rules check process of step 152, and the user at step 134 may then make adjustments or modifications to the one or more of the failed parameters of FCAL. to form another updated MPCAL. as described hereinabove. Thereafter, process 100 follows the steps described hereinabove to eventually form another FCAL.

It is to be understood that steps 152 and 154 of FIG. 3C are optional, and may be included in cases where FCAL. is formed after conducting the most recent calibration rules check of MPCAL. in the local rules check block 66 of the engine/calibration development computer 18 rather than within the host computer 16. In such cases, steps 152 and 154 are included to ensure that FCAL. passes the calibration rule set or sets resident within the rules check database 54 of the host computer 16 before it advances further in process 100. In cases where the most recent calibration rules check of MPCAL., that was transferred to the NIR server and database 50 by computer 18 as the final engine calibration parameter set FCAL., was carried out by the host computer 16, steps 152–154 may be omitted. It may be desirable in some embodiment to include steps 152 and 154 within process 100 to ensure that FCAL. passes the most recent version of the rule set or sets resident within the master rules check database 54 of the host computer 16.

In any case, process 100 advances from the "pass" branch of step 154 to step 156 where the final engine calibration parameter set, FCAL., is processed to generate a released engine calibration parameter set, RCAL. In one embodiment, step 156 takes place generally within and outside of host computer 16, and comprises a number of conventional engineering approval steps. Examples of such approval steps may include, but are not limited to, any of generating a product change request (PCR) or product definition request (PDR), routing the PCR or PDR through one or more appropriate approval paths, updating product tracking information, generating an electronic copy of an engineering job release (EJR), routing the EJR through one or more appropriate approval paths, and storing the released calibration parameter set, RCAL., into the engine calibration database 52 of the host computer 16. Thereafter, RCAL. is available for downloading, and process 100 may advance from step 156 to step 158 where RCAL. may be downloaded, via an appropriate service/recalibration, manufacturing or engineering tool (e.g., 34), to and engine control computer (ECC) of one or more new or existing engines.

It is to be understood that all or part of process 100 may be conducted to generate a released engine calibration parameter set, RCAL. For example, as just described, all of the steps of process 100 illustrated in FIGS. 3A–3C may be carried out to develop an engine calibration parameter set for a newly developed engine, or to develop a new engine calibration parameter set for an existing engine. Alternatively, steps 102–106 of FIG. 3A may be replaced by a step of downloading an existing engine calibration parameter set from the engine calibration database 52 of the host computer 16 to the memory unit 68 of the engine/calibration development computer, and then carrying out the remaining steps 108–152 of process 100 to modify an existing engine calibration parameter set for a new or existing engine.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A method of developing a calibration parameter set for an internal combustion engine, the method comprising the steps of:

(a) providing a first engine calibration parameter set to a calibration development computer;

(b) modifying in said calibration development computer at least one parameter of said first engine calibration parameter set to form a second engine calibration parameter set;

(c) providing one of said second engine calibration parameter set and said at least one modified parameter of said first engine calibration parameter set to said host computer; and (d) conducting in said host computer a first calibration rules check of said one of said second engine calibration parameter set and said at least one modified parameter of said first engine calibration parameter set against a rules check database resident therein.

2. The method of claim 1 further including the steps of:

(e) executing steps (f)–(h) after executing step (a) and before executing any of steps (b)–(d);

(f) downloading said first engine calibration parameter set from said calibration development computer to an engine control computer configured to control operation of the engine;

(g) conducting performance testing of the engine operating under control of said first engine calibration parameter set resident in said engine control computer; and (h) executing steps (b)–(d) only if the engine fails said performance testing.

3. The method of claim 2 further including the steps of:

(i) executing step (j) after executing step (g) and before executing any of steps (b)–(d);

(j) omitting steps (b)–(d) and providing said first engine calibration parameter set resident in said calibration development computer as a final engine calibration parameter set to a temporary database resident in said host computer if the engine passes said performance testing.

4. The method of claim 3 further including the step of conducting in said host computer a second calibration rules check of said final engine calibration parameter set.

5. The method of claim 4 further including the steps of:

(k) executing steps (l)–(m) if said final engine calibration parameter set passes said second calibration rules check:

(l) releasing said final engine calibration parameter set for production use; and (m) storing said final engine calibration parameter set within said engine calibration database of said host computer as a released engine calibration parameter set.

6. The method of claim 5 further including the step of downloading said released engine calibration parameter set into an engine control computer of a production engine without conducting a further rules check on said released engine calibration parameter set.

7. The method of claim 4 further including the step of notifying said calibration development computer that said final engine calibration parameter set requires modification if said final engine calibration parameter set fails said second calibration rules check.

8. The method of claim 1 further including the steps of:

(e) executing steps (f)–(g) only if said one of said second engine calibration parameter set and said at least one modified parameter of said first engine calibration parameter set passes said first calibration rules check;

(f) downloading said second engine calibration parameter set from said calibration development computer to an engine control computer configured to control operation of the engine; and (g) conducting performance testing of the engine operating under control of said second engine calibration parameter set resident in said engine control computer.

9. The method of claim 8 further including the steps of:

(h) executing steps (i)–(k) if said the engine fails said performance testing:

(i) modifying in said calibration development computer at least one parameter of said second engine calibration parameter set to form a third engine calibration parameter set;

(j) providing one of said third engine calibration parameter set and said at least one modified parameter of said second engine calibration parameter set to said host computer; and (k) conducting in said host computer a second calibration rules check of said one of said third engine calibration parameter set and said at least one modified parameter of said second engine calibration parameter set against said rules check database resident therein.

10. The method of claim 8 further including the step of providing said second engine calibration parameter set resident in said calibration development computer as a final engine calibration parameter set to a temporary database of said host computer if the engine passes said performance testing.

11. The method of claim 10 further including the step of conducting in said host computer a third calibration rules check of said final engine calibration parameter set.

12. The method of claim 11 further including the steps of:

(h) executing steps (i)–(j) if said final engine calibration parameter set passes said third calibration rules check:

(i) releasing said final engine calibration parameter set for production use; and (j) storing said final engine calibration parameter set within said engine calibration database of said host computer as a released engine calibration parameter set.

13. The method of claim 12 further including the step of downloading said released engine calibration parameter set into an engine control computer of a production engine without conducting a further rules check on said released engine calibration parameter set.

14. The method of claim 12 further including the step of notifying said calibration development computer that said final engine calibration parameter set requires modification if said final engine calibration parameter set fails said third calibration rules check.

15. The method of claim 1 further including the steps of:

(e) executing steps (f)–(h) before executing any of steps (a)–(d);

(f) providing to said host computer information relating to a set of desired engine specifications;

(g) selecting from an engine calibration database resident in said host computer an initial engine calibration parameter set corresponding to one of a number of engine calibration parameter sets stored therein that most closely matches said set of desired engine specifications; and (h) providing said initial engine calibration parameter set to said calibration development computer as said first engine calibration parameter set.

16. The method of claim 15 further including the steps of:

(i) modifying in said calibration development computer at least one parameter of said initial engine calibration parameter set to form a prototype engine calibration parameter set;

(j) conducting an initial calibration rules check of said prototype engine calibration parameter set against one of said rules check database and a local rules check database resident within said calibration development computer; and (k) storing said prototype engine calibration parameter set in said calibration development computer as said first engine calibration parameter set if said prototype engine calibration parameter set passes said initial calibration rules check.

17. The method of claim 16 further including the steps of:

(l) executing steps (m)–(n) if said prototype engine calibration parameter set fails said initial calibration rules check;

(m) modifying in said calibration development computer any one or more parameters of said prototype engine calibration parameter set identified as having failed said initial calibration rules check to form a modified prototype engine calibration parameter set;

(n) conducting another calibration rules check of said modified prototype engine calibration parameter set against one of said rules check database and said local rules check database resident within said calibration development computer; and (o) storing said modified prototype engine calibration parameter set in said calibration development computer as said first engine calibration parameter set if said modified prototype engine calibration parameter set passes said another calibration rules check.

18. The method of claim 1 further including the step of executing steps (c) and (d) following execution of steps (a) and (b) only if said calibration development computer is in communication with said host computer, and otherwise conducting in said calibration development computer said first calibration rules check of said one of said second engine calibration parameter set and said at least one modified parameter against a local rules check database resident therein.

19. The method of claim 18 further including the step of updating said local rules check database in said calibration development computer with said rules check database in said host computer upon establishing communications between said calibration development computer and said host computer.

20. A system for developing a calibration parameter set for an internal combustion engine, the system comprising:

a host computer including a first rules check database resident therein; and a calibration development computer configured to modify at least one parameter of a first engine calibration parameter set to form a second engine calibration parameter set, said calibration development computer configured to thereafter provide one of said second engine calibration data set and said at least one modified parameter of said first engine calibration parameter set to said host computer, said host computer configured to conduct a calibration rules check of said one of said second engine calibration data set and said at least one modified parameter of said first engine calibration parameter set against said first rules check database.

21. The system of claim 20 wherein said calibration development computer includes a second rules check database resident therein, said calibration development computer configured to provide said one of said second engine calibration data set to said host computer to conduct said calibration rules check only if said calibration development computer is in communication with said host computer, said calibration development computer otherwise conducting said calibration rules check against said second rules check database.

22. The system of claim 21 wherein said host computer is configured to update said second rules check database resident within said calibration development computer with said first rules check database resident within said host computer upon establishing communications with said calibration development computer.

* * * * *